Patented Dec. 22, 1936

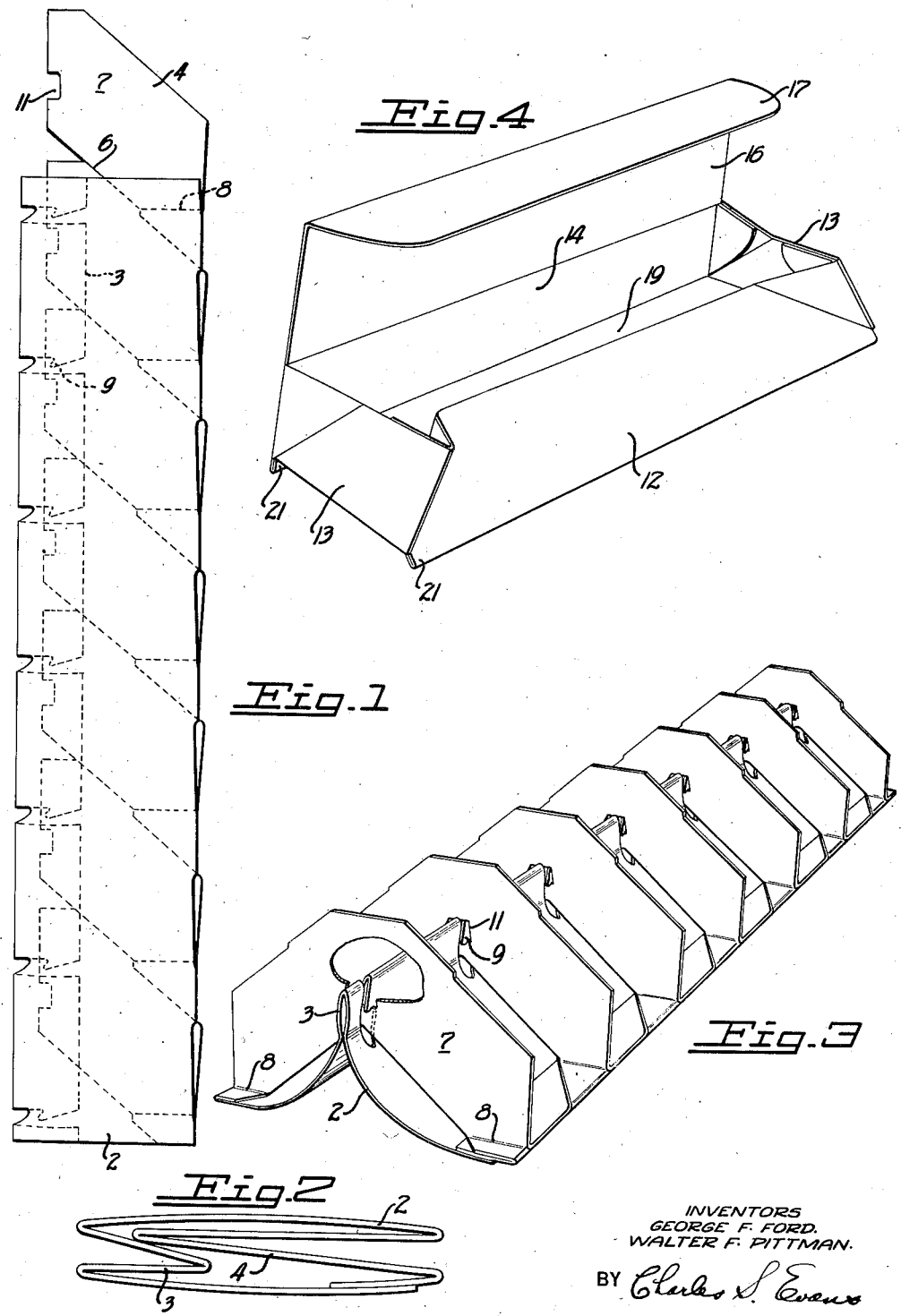

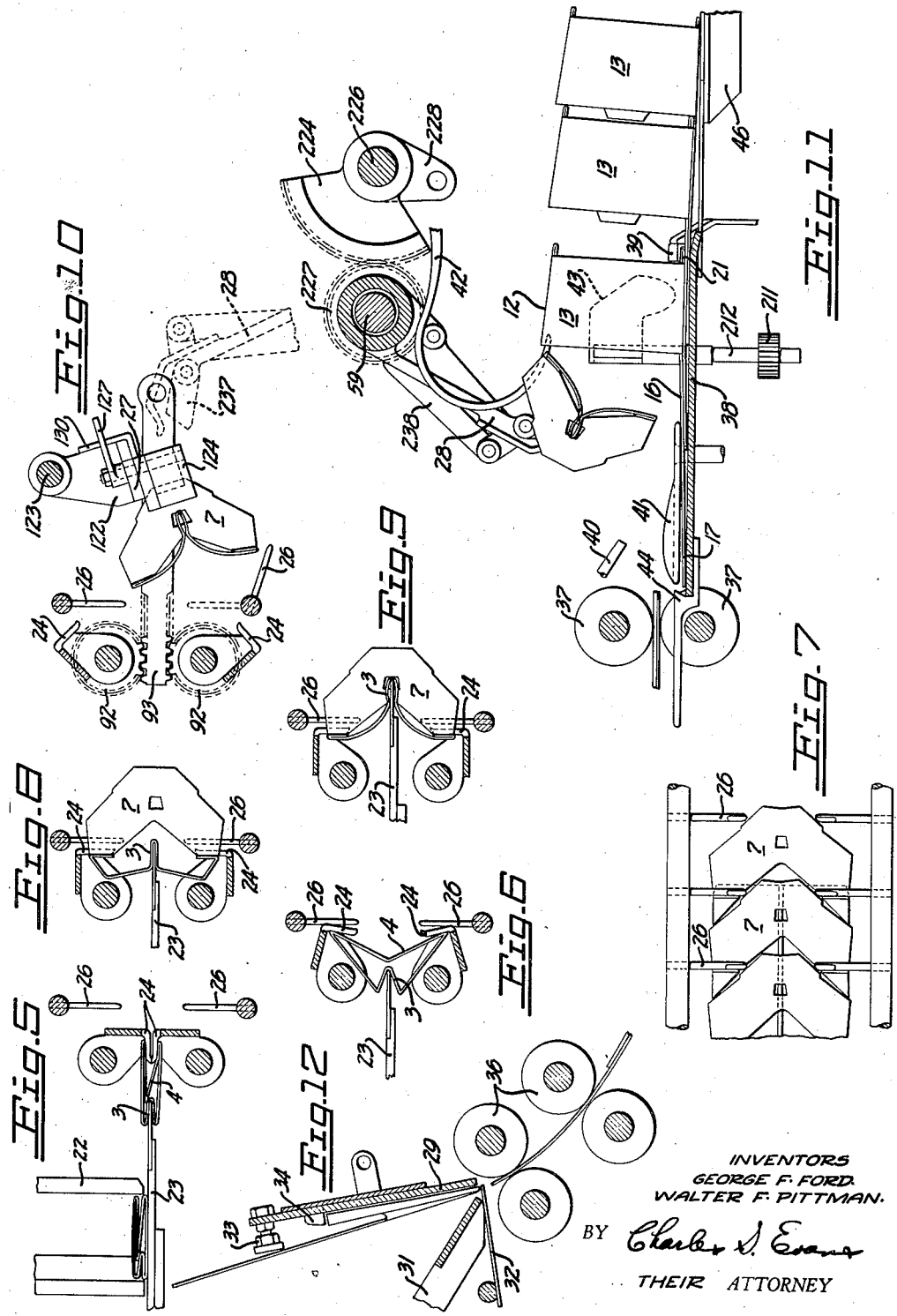

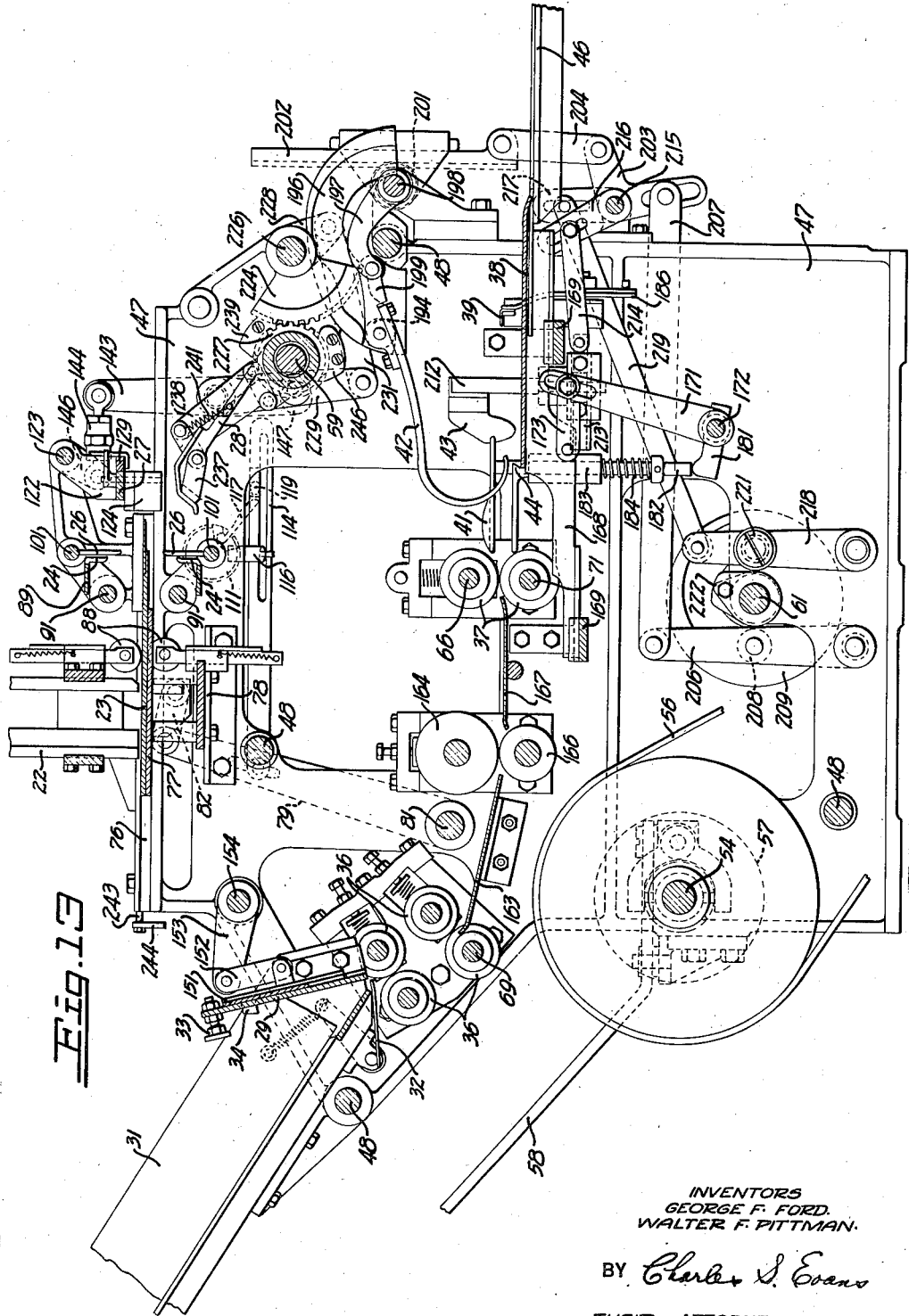

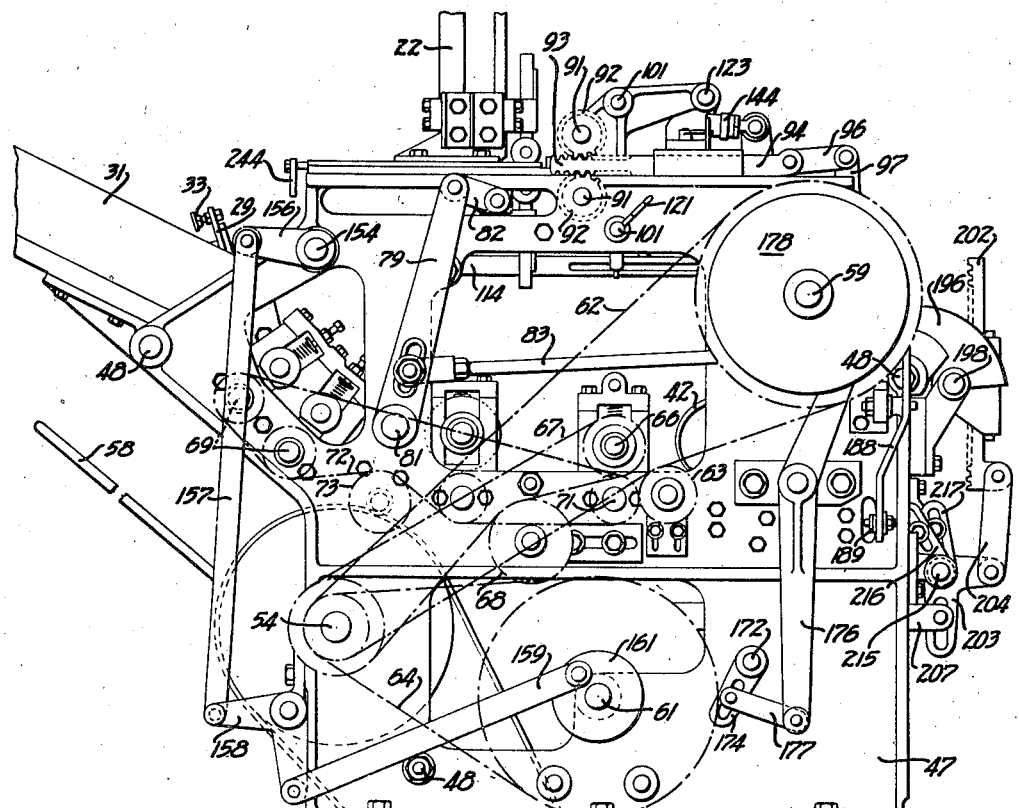

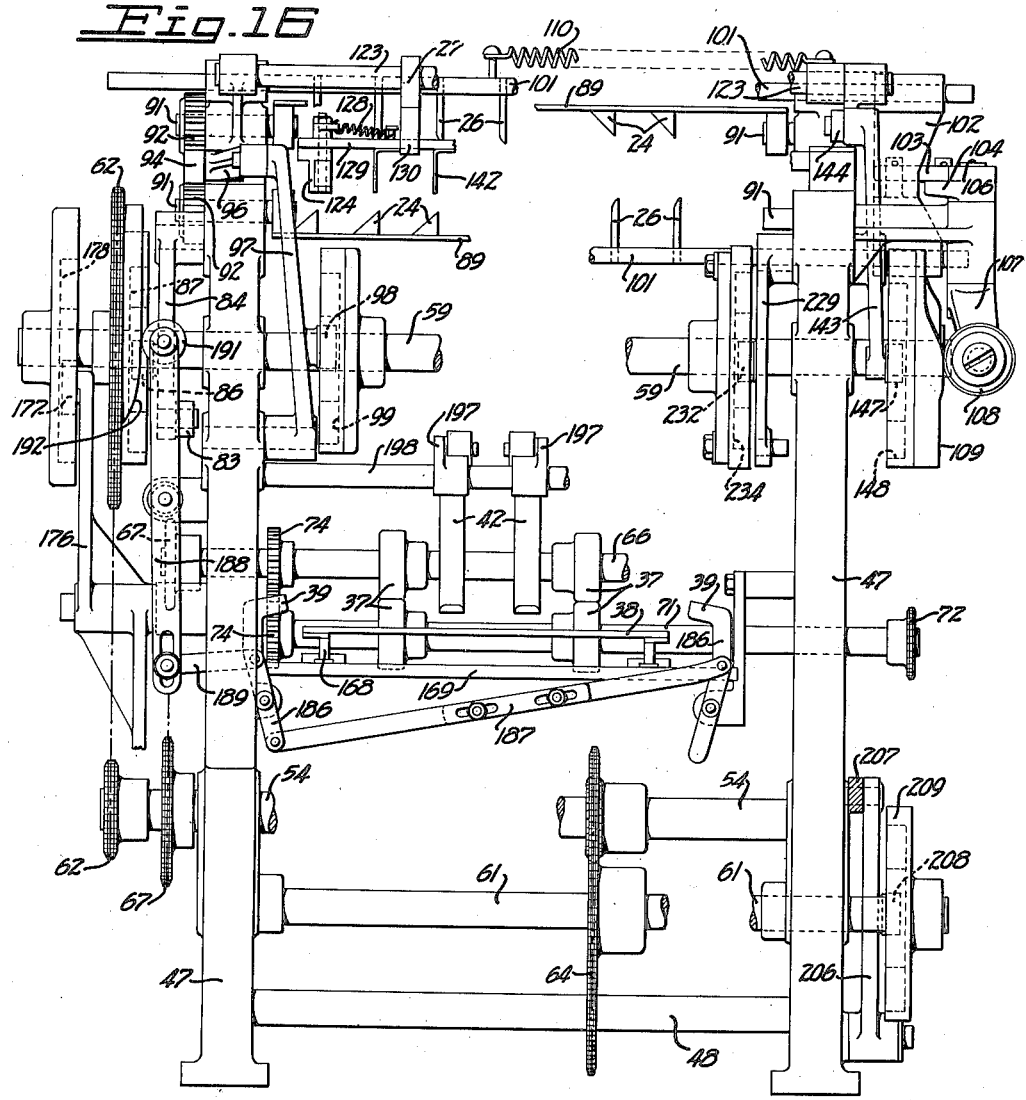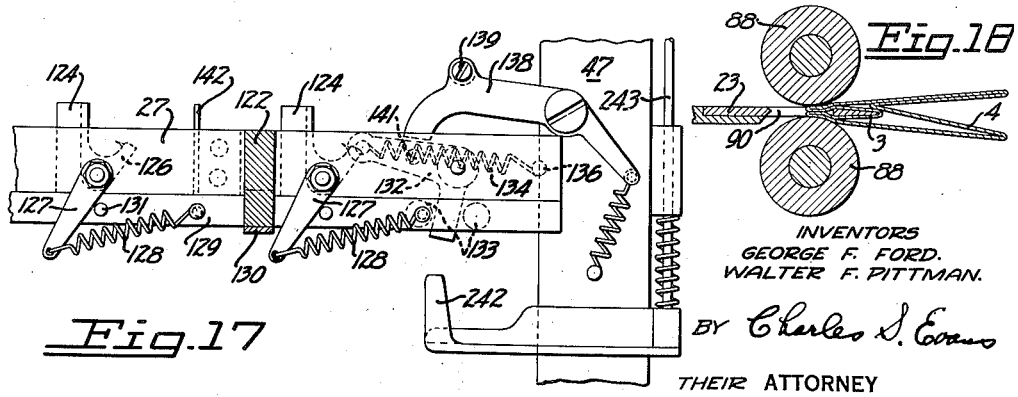

2,065,441

UNITED STATES PATENT OFFICE 2,065,441

METHOD AND APPARATUS FOR MAKING CONTAINERS

George F. Ford, Beverly Hills, and Walter F. Pittman, Huntington Park, Calif., assignors to Fibreboard Products Inc., San Francisco, Calif., a corporation of Delaware Application September 18, 1935, Serial No. 41,074

21 Claims. (Cl. 93—37)

Our invention relates to the making of egg containers, and more particularly to a method and apparatus for setting up egg fillers and placing the same in cartons.

It is among the objects of our invention to provide means for rapidly and automatically setting up collapsed egg fillers.

Other objects of our invention include the provision of means for unfolding collapsed cartons, and for automatically placing the folded fillers in the opened cartons.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:—

Figure 1 is a side view of a collapsed filler which is set up by the machine of our invention; and Figure 2 is an end view of the same.

Figure 3 is a prespective view of the filler after being set up.

Figure 4 is a perspective view of a partially opened carton, into which the filler is to be placed.

Figures 5 to 9, inclusive, are fragmentary views, largely diagrammatic, showing the various steps in setting up a filler; and Fig. 10 is a similar view showing the filler being removed from the folding devices.

Figure 11 is a vertical sectional view, also largely diagrammatic, showing a filler about to be inserted in one of the cartons; and Figure 12 is a similar view showing how the collapsed cartons are fed into the machine.

Figure 13 is a vertical sectional view of the upper portions of our improved machine.

Figure 14 is a side view of the machine; and

Figure 15 is a detail sectional view of the rake trip.

Figure 16 is an end view of the machine with portions of the structure broken away to disclose certain elements more clearly.

Figure 17 is a fragmentary horizontal sectional view showing the stripper bar.

Figure 18 is a detail view showing the spring pressed rollers ahead of the filler holding chute.

In terms of broad inclusion, our invention embraces a method and apparatus for setting up collapsed egg fillers, unfolding collapsed cartons, and placing the erected fillers in the opened cartons. The filler which we set up is of the type having collapsible walls and partitions; and the method of our invention comprises distending the collapsed walls, erecting the partitions, and then moving the walls and partitions into locking engagement.

Our method also comprises feeding the collapsed cartons to a position of rest, opening the cartons, and then positioning the erected fillers in the opened cartons. In our process, the opening of the cartons is timed with the setting up of the fillers, so that the cartons are successively opened in time to receive the erected fillers. The apparatus of our invention includes folding devices for automatically setting up the fillers; and also includes means timed with the setting up means, for unfolding the cartons. Means, also timed with the setting up means, are provided for receiving the fillers and depositing them in the cartons.

In greater detail, and referring particularly to the drawings, Figures 1 to 3 illustrate the type of egg filler which may be set up by the method and apparatus embodying our invention. The filler shown is of the type having collapsed walls and partitions, adapted to have its walls distended and its partitions erected to provide a cellular egg holding structure. It is understood that the principles of our invention are applicable generally to this type of filler; and not merely to the particular filler shown and chosen for purposes of illustration.

As shown in Figures 1 and 2, the collapsed filler chosen for purposes of illustration is creased and folded from a suitable blank to form a substantially flat elongated envelope, having side walls 2 and oppositely disposed infolded gussets 3 and 4. Referring particularly to Figure 1, the longer gusset 4 is provided with diagonal slots 6 to form tabs 7 foldably connected to the body of the envelope by crease lines 8. The short gusset 3 of the collapsed wall structure is provided with locking hooks 9, and the tabs on the gusset 4 are provided with locking apertures 11 for receiving the hooks 9. In this partially folded or collapsed condition of the fillers they may be stacked together and packed into compact space for shipment by the manufacturer.

When completely folded into the set up or erected position shown in Figure 3, the shorter gusset 3 of the filler wall structure forms the ridge between the egg holding troughs, while the distended side walls 2 of the envelope form the side walls of the inverted Y-shaped trough forming member. When the longer gusset 4 is folded out flat, and the tabs 7 turned out on the crease lines 8, the tabs 7 form inverted V-shaped partition members straddling the Y-shaped member. In the erected position of the filler, the hooks 9 are interengaged with the apertures 11 to lock the elements together. This filler is described in detail in our co-pending application Serial No. 7,946, filed February 25, 1935.

The collapsible carton into which the filler is placed is shown in Figure 4. This carton comprises an infoldable side wall 12 and end walls 13, adapted to collapse flat against the back side wall 14 and cover 16. When the carton is collapsed, the tuck 17 is folded out flat, and the bottom 19 is doubled back substantially parallel with the side wall 14, as will be readily understood. Preferably the carton is provided with leg flanges 21 extending downwardly as continuations of the side walls 12 and 14. When collapsed the cartons may be stacked together into compact space for shipment by the manufacturer. Such a carton is described in detail in the patent of Bruce F. Brown and George F. Ford, No. 1,876,200, issued September 6, 1932. Our present invention contemplates the provision of a machine for use by the consumer who receives the fillers and cartons in collapsed condition; which machine will automatically set up the fillers and deposit them in the cartons.

As best shown in Figures 5 to 9, the method and apparatus for setting up the fillers comprises holding the collapsed fillers in stacked relationship in a suitable chute 22, and reciprocating plate 23 under the chute so that the fillers are removed one at a time. As illustrated in Figure 5, the leading edge of the plate 23 engages the infolded ridge forming gusset 3, and advances the collapsed filler until a pair of rotatably mounted fingers 24 engage the tabbed partition forming gusset 4.

As the plate 23 continues to advance, the holding fingers 24 rotate outwardly. This operates to distend the walls of the filler and unfold the tabbed gusset 4, as shown in Figure 6. The distending of the collapsed walls under these conditions forces the side walls of the filler into an inverted Y-shape, with the gusset 3 forming the ridge along the Y. After the gusset 4 has been unfolded flat, rotation of the fingers 24 is stopped; but the plate 23 is continued in its advancing movement to press against the unfolded gusset 4 and force out the tabs 7. As soon as the tabs are tilted outwardly, the plate 23 is stopped. The tabs 7 now appear as shown in Figure 7, with the rakes 26 ready to move to the left to erect the tabs.

Figure 8 shows the tabs 7 after being turned out perpendicular to the walls of the filler. After the tabs or partitions 7 are erected, the rakes 26 are stopped, and the plate 23 again advanced to press the gusset 3 into interlocking engagement with the partitions 7. Figure 9 shows the plate 23 at the end of its advancing movement, with the gusset 3 of the wall structure interlocked with the erected partitions 7. The filler is then grasped by a stripper bar 27, following which the fingers 24 are rotated to release the filler and the lower rake 26 dropped out of the way. As shown in Figure 10, the bar 27 is swung outwardly to remove or strip the erected filler from the folding devices, and to position it for being grasped by the transfer arm 28.

Simultaneous with the setting up of the filler, a carton is fed forwardly to a position of rest, and then unfolded to receive the filler. Figure 12 shows a collapsed carton lying against a plate 29 positioned at the lower end of a chute 31. A series of collapsed cartons are stacked in the chute, so that a lower carton is always pressed against the plate 29. The lower ends of the plate 29 and chute 31 are spaced to provide an opening through which the carton may be passed, and a spring pressed finger 32 is provided for controlling the discharge of the cartons through this opening.

The collapsed cartons are stacked in the chute 31 so that the folded body portions of the carton face forwardly, and the upper portions of the cartons are held back by a stop 33, so that the natural spring in the cartons forces the folded portion of the inside carton against the plate 29. A slidable lug 34 projects thru the plate 29 to engage the carton, and when a carton is to be fed out of the chute the lug 34 is moved downwardly to press the carton past the finger 32 and into a set of feed rolls 36.

As shown in Figure 11, another pair of feed rolls 37 are provided to receive a carton and discharge it on a reciprocating table 38. This table is shown in retracted position; with a carton held on the table by a back stop 39 bearing down against the foot flange 21, and by a hold down plate 41 bearing against the cover 16 and tuck 17. The opening of the carton is effected by a hook 42 mounted to lift up on the upper side wall 12; and the unfolding is further assisted by a plate 43 adapted to rotate inwardly against an end wall 13 of the carton. Two of these plates are preferably provided, one for each end wall. Engagement of hook 42 with the carton wall is facilitated by an air blast issuing from a suitable nozzle 40. This nozzle is positioned to direct the blast so that air lifts up the folded walls of the carton. When so lifted, the hook 42 readily engages the wall.

Working in time with the unfolding of the carton, the transfer arm 28 receives a filler from the stripper bar 27 and swings it down into the open carton. During the insertion of the filler, the hook 42 and the plate 43 function as "shoe horns" to facilitate the entrance of the filler into the carton.

After a filler is inserted, the arm 28 is retracted, and the hold down elements 39 and 41 lifted. The table 38 then moves forwardly, with the end of the tuck caught under a lip 44, to move the carton and filler out of engagement with the hook 42 and plates 43. This movement also pushes previously filled cartons forwardly and out of the machine onto a suitable table or conveyor 46.

The general arrangement of the mechanism in the machine is illustrated in Figures 13, 14 and 16. The frame 47 of the machine preferably comprises a pair of side plates connected by suitable tie rods 48. As best shown in Figure 14, a shaft 49 is journaled adjacent the lower portion of the frame, and is connected to a motor 51 by a suitable belt drive 52. The motor is preferably mounted on an adjustable bracket 53, so that the drive belt may be tightened. A main drive shaft 54 is provided adjacent the intermediate portions of the frame, and is connected to the shaft 49 by a suitable drive 56. Rotation of the shaft 54 is controlled by a clutch 57 interposed between the shaft and the drive 56. A suitable lever 58 is provided for operating the clutch.

A main cam shaft 59 is provided adjacent the upper portion of the frame, and a second cam shaft 61 is provided adjacent the intermediate portions of the frame. The main cam shaft 59 is driven from the drive shaft 54 by a chain drive 62 having an idler sprocket 63; while the other cam shaft 61 is driven from the drive shaft 54 by a chain drive 64. The upper shaft 66 of the feed rolls 37 is connected to the drive shaft 54 by a chain drive 67 having an idler sprocket 68; while the lower shafts 69 of the feed rolls 36 are connected to the lower shaft 71 of the feed rolls 37 by a chain drive 72 including an idler sprocket 73. In order to provide a positive drive, the feed roll shafts 66 and 71 are connected by spur gears 74 (see Figure 16).

As best shown in Figures 13 and 14, the vertical chute 22 for holding the stacked fillers is mounted on the upper end of the frame 47; and the reciprocating plate 23 is slidably mounted in horizontal guideways 76 provided on the frame under the chute. A plate 77 underlying the reciprocating plate 23 and secured to the frame 47 by suitable brackets 78, is preferably provided for supporting the fillers under the chute when the plate 23 is retracted. The plate 23 is reciprocated by levers 79 fixed on a cross shaft 81, and connected at their upper ends to the plate by short links 82.

One of the levers 79, as shown in Figures 14 and 16, is connected by a rod 83 to another lever 84 pivotally mounted on the outside of the frame. This second lever carries a follower roller 86 running in a cam 87 mounted on the cam shaft 59. The cam is designed to impart the proper motion to the plate 23, as described in connection with the setting up of the filler.

As best shown in Figure 13, a pair of spring pressed rollers 88 are provided ahead of the chute, and between which a filler being discharged is pushed. As shown in Figure 18, the leading edge of plate 23 is provided with an opening 90 to allow the rollers 88 to press the rear end of the filler tightly together. This causes the forward gusset 4 to open up and insure engagement thereof with the fingers 24. The fingers 24 are carried on cross bars 89, which bars are eccentrically mounted on stub shafts 91 journaled in the frame 47. As shown in Figure 14, the shafts 91 adjacent one side of the machine have gears 92 meshed with a rack 93. This rack is formed on the end of a slide bar 94 connected by a link 96 to a lever 97 which is pivotally mounted on the frame 47. As shown in Figure 16, the lever 97 carries a follower roller 98 running in a cam 99 mounted on the cam shaft 59. This cam is designed to impart the desired motion to the fingers 24, as described in connection with the setting up of the filler.

As also best shown in Figure 16, the rakes 26 are carried by rods 101 slidably mounted in the frame 47. These rods are slidably connected together at one end by a yoke 102, and this yoke in turn is connected by a short link 103 to the rear end of a lever 104. The lever 104 is fixed at its forward end to a pin 106 journaled on the frame 47. Pin 106 also carries a forwardly projecting lever 107 having a follower roller 108 riding on the face of a cam 109 mounted on the cam shaft 59. A spring 110 operates to hold the follower roller 108 against the face of the cam. The cam is designed to move the rakes laterally as explained in connection with the setting up of the filler.

The means for depressing the lower rake in order to permit removal of the folded filler is best illustrated in Figures 13 and 15. As there shown, a grooved wheel 111 is mounted on the rotatably mounted lower rake rod 101 adjacent the yoke 102. A spring 112 is connected between the periphery of this wheel and the upper end of the yoke 102, and a pin 113 is provided on the wheel for engaging the yoke to limit rotation of the wheel. In this normal position, with the pin abutting the yoke, the lower rake tangs are in their upright position.

Rotation of the wheel to depress the rake is effected by a bar 114 slidably supported in a bracket 116 and connected at one end to one of the plate moving arms 79. A finger 117 is pivotally mounted on one side of the wheel 111, and normally assumes a downwardly extending position, limited by a stop 118 on the wheel. In this downwardly extending position of the finger the latter is in position to be engaged by a lug 119 on the slide bar 114. When the bar moves backwardly with the plate 23 the lug 119 carries the finger 117 backwardly to rotate the wheel 111 and depress the rake 26. Depression of the lower rake at this time permits the folded filler to be removed from the folding devices, as was explained in connection with Figure 10.

As the slide bar 114 continues to move backwardly the lug 119 finally passes out from under the finger 117; whereupon the spring 112 operates to rotate the rake back up to its vertical position. During the return movement of the slide bar 114 the lug 119 rides under the pivoted finger, and when the lug has passed the finger the latter drops back against the stop 118, so that it is again positioned for engagement by the lug 119.

The stripper bar which grasps the filler and removes it from the folding devices is best shown in Figures 10, 13, 16, and 17. This bar swings from a shaft 123 by arms 122, and carries a series of downwardly projecting fixed jaws 124, each having a spiked movable jaw 126 pivotally mounted adjacent thereto. In Figure 17 these jaws are shown open and in position to receive the forwardly projecting tabs 7 of the filler.

As shown in the latter figure, the movable jaws 126 are controlled by levers 127 fixed on the upper ends of the jaw pins. These levers are connected by springs 128 to a bar 129 which is slidably mounted in suitable brackets 130 on the jaw bar 27. Pins 131 are provided on the slide bar 129 adjacent the levers 127 for holding the movable jaws open against the action of the springs 128 when the slide bar 129 is moved to the left as shown in Figure 17. Movement of the slide bar is controlled by a bell crank 132 pivotally mounted on the bar 27 and having one of its arms disposed between a pair of pins 133 on the slide bar 129. The other end of the bell crank is provided with a spring 134 connected to a pin 136 on the bar 27, so that when the bell crank is shifted back and forth the unbalanced spring passes over the pivot center to hold the bell crank in either of its positions.

In the position shown in Figure 17, the slide bar 129 is toward the left and the jaws 126 are held open. This position corresponds to that in Figure 13, where the jaw carrying stripper bar 27 is forward and ready to receive a filler. Closing of jaws 126 is controlled by plate 23. As shown in Figure 17 a spring pressed lever 138 is mounted on the frame 47 in front of the stripper bar 27, and carries a pin 139 adapted to be engaged by the advancing plate, so that the lever is pushed back against a pin 141 on the bell crank 132. This movement snaps the bell crank backwardly and shifts the slide bar 129 toward the right to close the jaws 126. Since the filler is completely erected at this time, the closing jaws are in position to grasp the forwardly projecting tabs 7 of the filler. Suitable stops 142 are preferably provided on the jaw bar 122, against which the ridge portion 3 of the filler may abut as the jaws close in on the tabs 7.

Upon closing of the jaws, the stripper bar 27 is swung back with the filler. This back swing is effected by a lever 143 connected by a short link 144 to a lever 146 mounted on the end of shaft 123. The lever 143 is pivotally mounted on the frame and carries a follower roller 147 riding in a cam 148 mounted on the cam shaft 59. This cam is designed to give an inward and outward swinging movement to the jaw bar 27, in time with the movement of the plate 23 and other folding devices.

As to the handling of the carton into which the fillers are to be deposited, Figure 13 shows the carton feeding lug 34 mounted on a slidable plate 151 connected by a link 152 to a lever 153 mounted on a shaft 154. As better shown in Figure 14, the shaft 154 also carries a lever 156 connected by a bar 157 to an arm of a bell crank 158. The other arm of the bell crank is pivotally connected to a bar 159 which is pivoted on the face of the wheel 161 mounted on the shaft 61. This linkage is designed to raise and lower the lug 34 in time with the other movements of the machine, so that the cartons are discharged from the chute 31 at the proper intervals.

As the collapsed cartons are discharged from the chute 31 they are fed forwardly by the spring pressed feed rollers 36 and over a plate 163 to a dating roll 164. This roll may operate to emboss a suitable date on the carton, or may be used to place any other desirable indicia on the carton. The roll 166 which lies under the dating roll 164 is positively driven by the chain 72, as shown in Figure 14. After leaving the dating roll 164 the carton passes over a plate 167 to the next pair of feeding rollers 37.

From the feed rolls 37 the carton is deposited on the reciprocating table 38, which at this time is moving toward its retracted position. As illustrated in Figure 13, the table 38 is mounted on runners 168 slidably supported on guide ways 169. The table is shifted by a lever 171 mounted on a shaft 172 and pivotally connected at its upper end to the table by a link 173.

As shown in Figures 14 and 16, the shaft 172 also carries a short lever 174 pivotally connected to the lower end of a bell crank 176 by a link 177. The upper end of this bell crank, as best shown in Figure 16, carries a follower roller 177 running in a cam 178 mounted on the cam shaft 59. This cam is designed to reciprocate the table 38 from the retracted position shown in Figure 11 to the extended position shown in Figure 13.

As the table moves to its retracted position and a carton is fed over it and against the back stops 39 by the rollers 37, the hold down plate 41 moves down on the table to hold the cover and tuck of the carton. This downward movement of the plate 41 is controlled by a trigger 181 fixed on the shaft 172 and bearing against a rod 182 which supports the hold down plate. This rod is slidably held in a guide 183, and is pressed against the trigger 181 by a spring 184. By this arrangement the hold down plate 41 is lowered when the table is retracted, and is elevated when the table is advanced. Preferably two hold down plates are provided, one on each side of the table 38.

The operation of the back stops 39 is best illustrated in Figure 16. As there shown, the stops are formed on the upper ends of levers 186 pivotally mounted on the frame 47 and connected for movement together by a cross link 187. One of the levers 186 is connected to the lower end of a control lever 188 by a link 189. This control lever is pivotally mounted on the frame and carries on its upper end a follower roller 191 riding on the face of a cam 192 mounted on the cam shaft 59. This cam is designed to lower the stops 39 against the foot flange 21 to hold the rear end of the carton down on the table. After a filler has been deposited in the carton, the cam 192 operates to swing these stops out of the way so that the filled carton may be pushed forwardly as the table advances.

The opening hook 42 is given a predetermined motion by a follower roller 194 riding in a fixed cam 196. This cam is designed to give the hook an upward and rearward movement, best suited to open the carton. The hook is hauled back by a lever 197 fixed on a shaft 198 pivotally connected at its forward end to an extension 199 of the hook. This pivoting of the hook back of the follower roller 194 also assists in giving the desired movement to the hook. Preferably two of these hooks are provided, working side by side, as shown in Figure 16.

The hook operating shaft 198 is rotated by a pinion 201 engaged by a rack 202. See Figure 13. This rack is reciprocated by a bell crank 203 having one arm connected to the rack by a link 204, and having the other arm connected to a lever 206 by a bar 207. As shown in Figure 16, the lever 206 is pivotally mounted on the frame 47 and carries a follower roller 208 running in a cam 209 mounted on the shaft 61. This cam is designed to haul back on the hooks 42 when a carton is ready to be opened.

Inward rotation of the plates 43 to press out the ends of the carton is effected by a pinion 211 fixed on the lower end of the plate holding rod 212, and engaging a rack 213. This rack is connected by a link 214 to a lever 216 fixed on the shaft 215. Another lever 217, also fixed on the shaft 215, is connected to a lever 218 by a bar 219. The lever 218 is pivotally mounted on the frame 47 and carries a follower roller 221 riding on a cam 222 fixed on the shaft 61. This cam is preferably made in two halves, so that the halves may be separated or pressed together to vary the shape of the cam. The shape of this cam is adjusted to swing the plates 43 inwardly at the moment the hooks 42 raise up the front side wall of the carton. Backward rotation of the plates 43 is not effected until after the carton with its enclosed filler has been moved forwardly and out of engagement with the plates.

A filler is moved downwardly and placed into an opened carton by the transfer arm 28 which is pivoted for free rotation about the cam shaft 59. As shown in Figure 13, rotation of the arm is effected by a segment gear 224 mounted on a shaft 226 and meshing with a gear 227 connected with the arm 28. A lever 228 is also fixed on the shaft 226 and is connected to an operating lever 229 by a link 231. As better shown in Figure 16, the lever 229 is pivotally mounted on the frame 47 and carries a follower roller 232 riding in a cam 234 mounted on the cam shaft 59. This cam is designed to oscillate the segment gear 224 and swing the arm 28 up and down in time with the other cooperating elements of the machine.

At the time the stripper bar 27 swings back with a folded filler, the transfer arm 28 is positioned as shown by the dotted lines in Figure 10. In the latter figure, the stripper bar and filler are shown at an intermediate position during the back swing. When the stripper bar has completed its back swing the filler is positioned so that its ridge portions 3 may be engaged by the transfer arm 27 as the latter swings downwardly. At the instant of engagement, a jaw 237 on the arm 28 closes to grasp the filler. The operation of the jaw is controlled by a parallel linkage 238 pivotally mounted on the arm 28, and arranged so that the rear end of the linkage rides up on a fixed cam 239 to force the jaw open against the action of a spring 241 when the transfer arm is in the up position. Upon downward movement of the transfer arm 28 the linkage rides off the cam 239 to close the jaw 237; and this closing is timed to grasp the filler at the instant when the transfer arm moves into engagement with the filler.

As the filler is picked up by the transfer arm 28 the jaws 126 on the stripper bar are opened. This opening is effected by a spring pressed finger 242 adapted to engage the pin 141 and press the bell crank 132 backwardly to open jaws 126. The finger 242 is moved forwardly by a slide rod 243 having a block 244 at its forward end adapted to be engaged by the lever 79. See Figure 13. The block 244 is positioned so that the finger 242 is moved forwardly to open the jaws 126 at the proper instant.

While the stripper bar is back, and before the transfer arm 28 swings down with the filler, the lower rake is returned to its upright position so as not to be in the way of the down moving filler. The transfer arm 28 now swings down carrying the filler, and the timing is such that a carton is standing open to receive the filler as the arm approaches the carton. As the arm 28 pushes the filler into the carton, the parallel linkage 238 rides against another fixed cam 246 to force the jaw 237 open. At this instant the table 38 advances to carry the carton and enclosed filler out of engagement with the arm 28. As soon as the filler is clear of the arm 28 the latter returns to its upward position to receive another filler.

While we have shown means for both setting up the fillers and placing the same in cartons, it is understood that a machine could be made embodying only the means for setting the fillers. Such a machine would perform the operations shown in Figures 5 to 10. In this case, the folded fillers could be dropped from the stripper bar 27 onto a conveyor from which they might then be taken and positioned into cartons by hand.

We claim:

1. A machine for setting up collapsible fillers having partitions and placing the same in cartons, comprising means for setting up a filler and erecting its partitions, means for holding a carton, and means for positioning the erected filler in the carton.

2. A machine for setting up collapsible fillers having partitions and placing the same in collapsible cartons, comprising means for setting up a filler and erecting its partitions, means for opening a carton, and means for positioning the erected filler in the opened carton.

3. A machine for setting up collapsible fillers and placing the same in collapsible cartons, comprising means for setting up the fillers, means for feeding the cartons in succession to a filler receiving position, means for opening a carton in said position, and means comprising a pivotally mounted arm for receiving an erected filler and depositing it in a carton.

4. A machine for setting up a filler and placing the same in a carton, said filler having collapsed walls and partitions, comprising means for distending the walls of the filler, means for erecting the partitions, means for moving the walls into engagement with the erected partitions, means for holding a carton, and means for positioning a filler in the carton.

5. A machine for setting up a filler having collapsed partitions, comprising means for holding the filler, and a slidably mounted rake movable longitudinally of said filler for erecting the partitions.

6. A machine for setting up a filler from a blank creased and folded to form an envelope having oppositely disposed infolded gussets, comprising a plate engaging one of the gussets, a pair of fingers engaging the other gusset, means for moving the fingers outwardly, and means for simultaneously advancing the plate to unfold the opposing gusset and to move its gusset into engagement with the unfolded gusset.

7. A machine for setting up a filler from a blank creased and folded to form an envelope having oppositely disposed infolded gussets, one of the gussets being creased and slotted to provide hinged tabs, comprising a plate engaging the untabbed gusset, a pair of fingers engaging the tabbed gusset, means for moving the fingers outwardly, means for simultaneously advancing the plate to unfold the tabbed gusset, means for turning out the hinged tabs, and means for continuing the advancement of the plate to move the untabbed gusset into engagement with the outturned tabs.

8. A machine for setting up a filler from a blank creased and folded to form an envelope having oppositely disposed infolded gussets, comprising means for holding the envelopes vertically stacked, a plate movably mounted to engage a gusset of the underlying envelope for removing said envelope from the stack, a pair of fingers arranged to engage the other gusset of the removed envelope, means for moving the fingers outwardly, and means for simultaneously advancing the plate to unfold the opposing gusset and to move its gussets into engagement with the unfolded gusset.

9. A machine for setting up a filler from a blank creased and folded to form an envelope having oppositely disposed infolded gussets, comprising a plate engaging one of the gussets, a pair of rotatably mounted fingers engaging the other gusset, means for rotating the fingers outwardly, and means for simultaneously advancing the plate to unfold the opposing gusset and to move its gusset into engagement with the unfolded gusset.

10. A machine for setting up a filler from a blank creased and folded to form an envelope having oppositely disposed infolded gussets, one of the gussets being creased and slotted to provide hinged tabs, comprising a plate engaging the untabbed gusset, a pair of fingers engaging the tabbed gusset, means for moving the fingers outwardly, means for simultaneously advancing the plate to unfold the tabbed gusset, rakes engaging the tabs and movable transversely of said plate for turning out said tabs, and means for continuing the advancement of the plate to move the untabbed gusset into engagement with the outturned tabs.

11. A machine for setting up a filler from a blank creased and folded to form an envelope having oppositely disposed infolded gussets, comprising a plate engaging one of the gussets, a pair of fingers engaging the other gusset, means for moving the fingers outwardly, means for simultaneously advancing the plate to unfold the opposing gusset and to move its gusset into engagement with the unfolded gusset, and means for removing the filler from said setting up mechanism.

12. A machine for opening a carton having infolded side and end walls, comprising means for holding down one of the side walls of the carton, means for lifting up the other side wall, and means for pressing out the end walls.

13. A machine for opening a carton having infolded side and end walls, comprising means for holding down one of the side walls of the carton, a hook for lifting up the other side wall, and plates for pressing out the end walls.

14. The method of setting up a filler from a blank creased and folded to form an envelope having oppositely disposed infolded gussets, said gussets having locking means thereon; which comprises pressing inwardly on one of the gussets while simultaneously unfolding the other gusset, and continuing to press inwardly on said first gusset to move the latter into locking engagement with the unfolded gusset.

15. The method of setting up a filler from a blank creased and folded to form an envelope having oppositely disposed infolded gussets, one of said gussets being creased and slotted to provide hinged tabs, and the other gusset and said tabs having interlocking means thereon; which comprises pressing inwardly on the untabbed gusset while simultaneously unfolding the tabbed gusset, turning out the hinged tabs, and continuing to press inwardly on the untabbed gusset to move the latter into locking engagement with the outturned tabs of the unfolded gusset.

16. A machine for setting up fillers having collapsed walls and partitions, comprising a shute for holding a stack of the collapsed fillers, a plate for engaging a filler and removing it from the shute, means operable upon movement of said plate for distending the walls of the filler, means for erecting the partitions, and means for further advancing the plate to move the walls into engagement with the erected partitions.

17. A machine for setting up a filler from a blank creased and folded to form an envelope having oppositely disposed infolded gussets, comprising a plate engaging one of the gussets, a pair of fingers engaging the other gusset, and means for moving the fingers outwardly and simultaneously effecting a relative movement between the plate and fingers for unfolding one of the gussets and moving the other gusset into engagement with it.

18. A machine for setting up collapsible fillers and placing the same in cartons, comprising means for setting up a filler, means for holding a carton in a position spaced vertically from the setting up means and facing toward the latter, and a revolvable arm for receiving the filler from the setting up means and swinging it downwardly into the carton.

19. A machine for setting up collapsible fillers and placing the same in cartons, comprising means for setting up a filler, means for holding a carton in a position spaced vertically from the setting up means and facing toward the latter, a revolvable arm for receiving the filler from the setting-up means and swinging it downwardly into the carton, jaws on the arm for gripping the filler, and means timed with the movement of the arm for closing the jaws to engage the filler adjacent the setting-up means and for opening the jaws to release the filler when inserted in the carton.

20. A machine for setting up a collapsed filler and placing the same in a carton having collapsible side walls with a cover extending from one edge of one of said walls, means for feeding the carton to a filler receiving position, means pressing downwardly on the cover for holding the carton in said position, means lifting upwardly on a side wall for opening the carton, means for setting up the filler, and means for receiving the filler from the setting-up means and inserting it in the opened carton.

21. A machine for setting up a collapsed filler and placing the same in a carton having collapsible side walls with a cover extending from one edge of one of said walls and a leg extending from the other edge, means for feeding the carton to a filler receiving position, means pressing downwardly on the cover and leg for holding the carton in said position, means lifting upwardly on a side wall for opening the carton, means for setting up the filler, and means for receiving the filler from the setting up means and inserting it in the opened carton.

GEORGE F. FORD.
WALTER F. PITTMAN.